United States Patent [19]

Kanger

[11] 4,277,221

[45] Jul. 7, 1981

[54] WICKET GATE BEARING SEAL

[75] Inventor: Feodor Kanger, Montreal, Canada

[73] Assignee: Dominion Engineering Works Limited, Lachine, Canada

[21] Appl. No.: 934,708

[22] Filed: Aug. 21, 1978

Related U.S. Application Data

[63] Continuation-in-part of Ser. No. 785,504, Apr. 7, 1977, abandoned.

[30] Foreign Application Priority Data

Apr. 22, 1976 [CA] Canada ................................. 250770

[51] Int. Cl.³ .............................................. F03B 3/18
[52] U.S. Cl. .................................... 415/160; 415/175
[58] Field of Search ............... 415/160, 161, 163, 162, 415/164, 165, 147, 150, 45, 110, 113, 175, 191, 208, 500; 277/3, 27, 72 R

[56] References Cited

U.S. PATENT DOCUMENTS

| | | | |
|---|---|---|---|
| 2,651,492 | 9/1953 | Feilden | 415/160 |
| 3,542,484 | 11/1970 | Mason | 415/160 |
| 3,582,231 | 6/1971 | Zerlauth | 415/175 X |
| 3,685,921 | 8/1972 | Dekeyser | 415/160 X |
| 3,947,147 | 3/1976 | Loktaeva et al. | 415/163 X |
| 4,203,703 | 5/1980 | Koeller | 415/113 |

FOREIGN PATENT DOCUMENTS

| | | | |
|---|---|---|---|
| 200707 | 11/1958 | Austria | 415/163 |
| 1128750 | 8/1956 | France | 415/163 |
| 1266309 | 5/1961 | France | 415/163 |
| 1292342 | 3/1962 | France | 415/163 |
| 215738 | 10/1941 | Switzerland | 415/163 |

*Primary Examiner*—Leonard E. Smith
*Attorney, Agent, or Firm*—Raymond A. Eckersley

[57] ABSTRACT

Hydraulic turbo machines including pumps and pump turbines having pivotally adjustable wicket gates are vulnerable to damage caused by the ingress of dirty water containing abrasive particles into the bushings in which the stems of the wicket gates are pivotally supported in the headcover and bottom ring. This problem is overcome by the provision of individual seals between the end of each wicket gate and an adjoining surface portion of the headcover or bottom ring in which the bushings are located. In addition, seal water at a pressure in excess of machine operating pressure forces the seal ring into contact with the end of the wicket gate and also causes a slight flow of clean water outwardly between the seal and the respective end of the wicket gate, so as to keep the seal entry zone flushed clear of particulate material.

8 Claims, 2 Drawing Figures

WICKET GATE BEARING SEAL

This application is a continuation-in-part of my application Ser. No. 785,504, filed Apr. 7, 1977, now abandoned.

BACKGROUND OF THE INVENTION

This invention is directed to the construction of a hydraulic turbo-machine such as a pump or pump turbine, and in particular to a wicket gate stem seal to preclude ingress of contaminated water into the bearings of the wicket gates.

In the case of turbo-machines such as Francis turbines or pump turbines having adjustable wicket gates the problem arises under conditions of operation with contaminated water containing abrasive particles that the bushings of the wicket gates may become infiltrated by the contaminated water, particularly under conditions of shut-down when the wicket gates are in the fully closed condition, or under base load conditions, when the setting of the wicket gates can remain unchanged for a matter of weeks at a time. The presence of such contaminants can result in a tendency of the wicket gate spindles to seize in their bushings under such conditions of operation, or to generate wear in the spindles and bushings and so cause inaccuracy in gate settings which can lead to overload of the control mechanism. Ultimately these effects of contamination can lead to machine failure, or at least necessitate taking the machine out of service, for purposes of maintenance. In as much as the wicket gates are normally relied upon to regulate machine operation, including the shutting down of the machine, the malfunctioning of the wicket gates can lead to very serious consequences.

In the case of gas turbines, these machines are not considered to be analogous in their structure to water pumps and turbines, on account of the extreme differences in ambient temperature conditions, dynamic forces acting on the respective guide vanes, and totally different functional requirements between a hot and compressible gaseous working fluid and a cold, incompressible liquid working fluid. In gas turbine technology it is well known to introduce air as a lubricating fluid to the bearings of the variable guide vanes, as shown in U.S. Pat. No. 3,542,484, Mason, issued Nov. 24, 1970. Mason also shows a loading spring to axially load his guide vanes radially outwardly against the bearing seating, under shut-down conditions. The use of air as a cooling medium for the bearings of gas turbine guide vanes is shown in U.S. Pat. No. 3,582,231 Zerlauth, issued June 1, 1971.

Sealing of the end surfaces of wicket gates is shown in U.S. Pat. No. 3,947,147, Loktaeva et al, issued Mar. 30, 1976, in which an annular gasket is located between an axial end surface of the wicket gate and the rim of the housing.

The prior art does not show the use of either gaseous or liquid fluid for purging purposes to avoid contamination of the vane bearings.

Furthermore, the use of an axially spring loaded seal also is not known. In the case of U.S. Pat. No. 3,685,921, Dekeyser, issued Aug. 22, 1972, the blades of a gas turbine guide ring are biased radially inwardly against an inner casing.

The problem of coping with contaminated water for driving a turbine, bearing abrasive solid particles is in no way approached in the prior art. In the extreme, abrasive particulate content as high as about 40% by weight has been known, on an irregular basis, and the present disclosure represents one effort to minimize some of the effects that such conditions may produce.

SUMMARY OF THE INVENTION

The present invention provides a wicket gate trunnion support system suited for use in pumps and pump turbines, having a plurality of wicket gates each pivotally mounted on a top stem extending from a recess in a head-cover of the machine and a bottom stem extending into a recess within a bottom ring of the machine, bearing means extending about each stem in interposed relation between the stem and the respective recess to provide transverse support to the gate, and stem seal means extending in substantial sealing relation with the recess and extending from the recess in coaxial relation with the stem, having an annular axial end face in sealing relation with an end surface of the gate, loading spring means exerting axial thrust to hold the stem seal means in loaded relation against the gate end surface and passage means connected to the recess to introduce liquid under pressure within the recess for passage outwardly towards the gate to preclude ingress to the seal means of working liquid passing through a main flow passage of the machine, to ensure gate operation capability at all times for opening the gates, and for closing the gates to shut down the machine.

The stem seal means is maintained in sealed relation with the recess by means of an annular resilient seal ring.

The stem bearing means may be sealed to the recess by way of an annular resilient seal ring such as an O-ring. Similarly an O-ring seal can be used to seal the stem bearing means to the stem to preclude extrusion of lubricant under the pressure of flushing liquid.

The liquid supply means is generally pressurized to a value in excess of machine operating pressure, so as to maintain an outflow of the liquid in flushing relation past the stem seal means.

The provision of a bearing bushing having a groove about the outer peripheral surface thereof to receive a sealing O-ring therein, and an annular gallery about the outer periphery of the bushing to receive sealing liquid from a passage in the headcover simplifies the arrangement.

DESCRIPTION OF THE DRAWINGS

Certain embodiments of the invention are described, reference being made to the accompanying drawings, wherein.

DETAILED DESCRIPTION OF THE INVENTION

Figure 1:
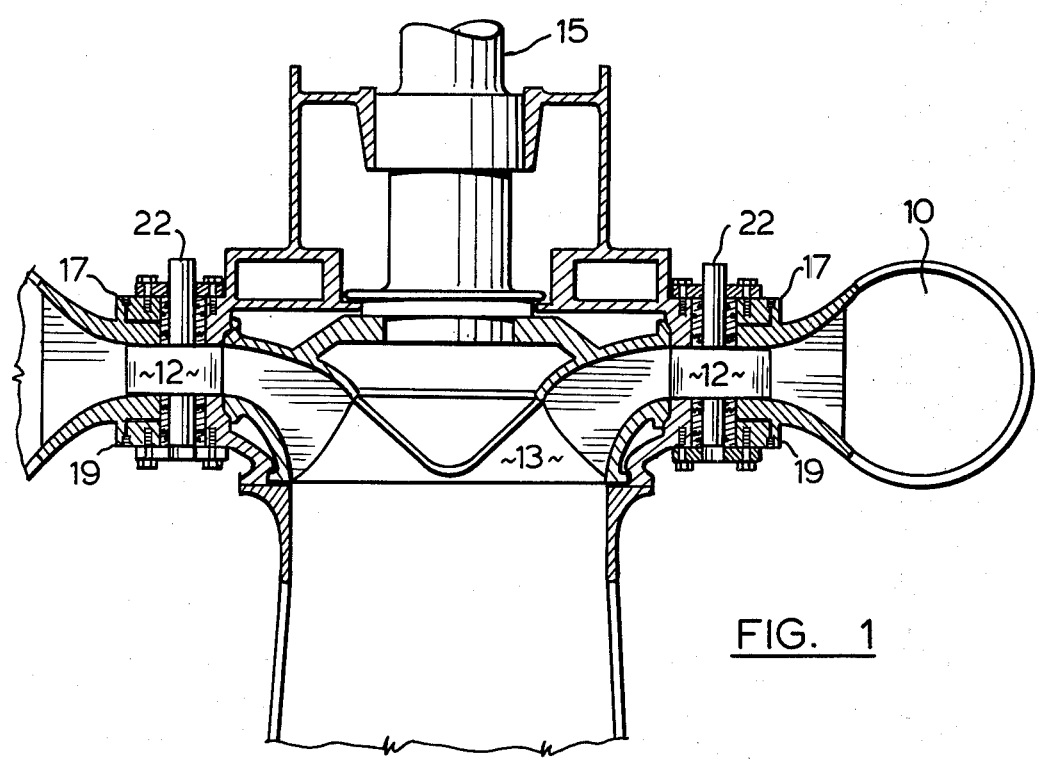
FIG. 1 is a diametrical cross-section, in elevation, of a machine utilizing the present invention.

Referring to FIG. 1, the Francis type machine has an annular scroll 10 within which a runner 13 is supported by way of shaft 15. An annular array of wicket gates 12 are interposed between scroll 10 and runner 13 in flow controlling relation.

The stems 22 of the wicket gates extend upwardly through the machine headcover 17 and downwardly into the bottom ring 19.

Figure 2:
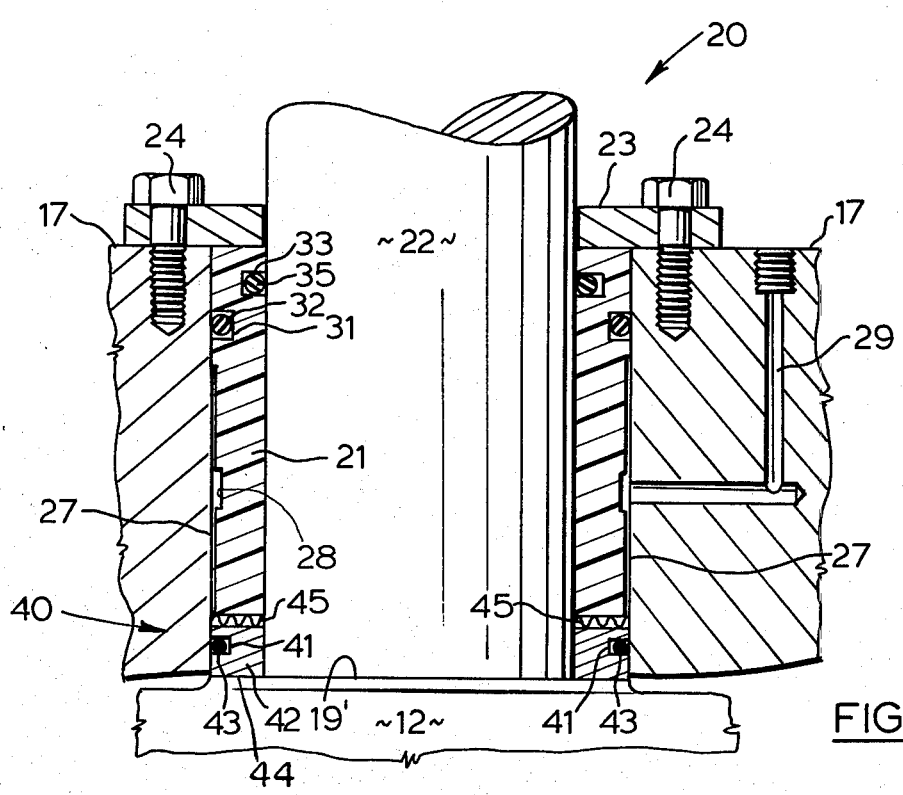
FIG. 2 shows typical particulars of the subject seal arrangement with relation to a headcover spindle seal.

Referring to FIG. 2, the arrangement 20 shows a wicket gate 12 having stem 22 extending upwards through a cylindrical recess 27 in the headcover 17. A bearing bushing 21 is retained by keeper 23, being secured by capscrews 24. The bushing 21 has an outer groove 31 within which an O-ring seal 32 is located and a radially inner groove 33 within which an O-ring seal 35 is located.

An annular gallery 28 is located in axially aligned relation with a liquid supply passage 29.

A stem seal 40 comprises an annular ring 42 having a lower axial end face 44 in sealing relation with the adjoining end surface 19' of wicket gate 12. A groove 41 contains an elastomeric O-ring seal 43 which seals against the headcover recess 27, to limit the consumption of flushing water. If the machining of ring 42 and recess 27 provides substantial sealing against such leakage, then the O-ring seal 43 may be dispensed with.

A convoluted annular plate spring 45 interposed between bushing 21 and stem seal 40 serves to resiliently press the seal 40 in sealing relation against the end surface 19' of wicket gate 12, to serve as resilient axial loading means for the seal 40.

A source of pressurized flushing liquid, (not shown), such as clean water, is connected supply passage 29.

By controlling the pressure of the flushing liquid to a value slightly in excess of the pressure of the working liquid at the wicket gates, a minimal out-flow of flushing liquid is obtained, to preclude ingress of the working liquid into the stem bushing 21, while limiting the quantity of flushing liquid required.

Where they are environmentally acceptable, alternative fluids may be considered, such as grease or oil.

What I claim as new and desire to secure by Letters Patent of the United States is:

1. In a turbo-hydraulic machine having a plurality of wicket gates, each pivotally mounted on a top stem extending from a recess in a headcover of the machine and a bottom stem extending into a recess within a bottom ring of the machine, each stem having bearing bushing means thereon positioning said stem in centred relation in a said recess, a stem seal located at least partially within said recess interposed between the bushing means and extending outwardly from the recess in sealing relation with an end surface of the gate, said seal having an O-ring seal extending thereabout in sealing relation with the recess; seal means at the end of said bushing means remote from said gate to provide a sealing between the stem and the bushing and between the bushing and the wall of the recess; and liquid supply passage means adjacent said bushing means to provide flushing liquid to the recess for passage between said stem and said stem seal, to flow outwardly therefrom between said stem seal and said gate end surface, to substantially preclude the ingress of working fluid from within the machine into said recess.

2. The machine according to claim 1 having plate spring means between said bearing bushing and said stem seal in axially interpositioned relation, to resiliently bias said stem seal in axial pressing relation against said gate end surface.

3. In a turbo-hydraulic machine having a plurality of wicket gates, each pivotally mounted on a top stem extending from a recess in a headcover of the machine and a bottom stem extending into a recess within a bottom ring of the machine, bearing means located within said recess extending about each stem in interposed relation between the stem and the respective said recess to provide transverse support to the gate, the improvement comprising stem seal means coaxial with said bearing means, located within said recess in interposed relation between said bearing means and said gate in substantial sealing relation with said recess and extending from said recess in coaxial relation with the stem, having an annular axial end face in sealing relation with an end surface of said gate, loading spring means exerting axial thrust to hold said stem seal means in loaded relation against said gate end surface and passage means to introduce flushing liquid under pressure within said recess for passage radially inwardly to said stem and axially outwardly towards said gate to flow radially outwardly between said seal end face and said gate end surface to exclude ingress into the seal means of working liquid passing through a main flow passage of the machine to ensure gate operation capability at all times for opening the gates, and closing the gates to shut down the machine.

4. The machine as claimed in claim 3, said liquid introducing passage means intersecting a said stem recess, said gate stem bearing means including seal means to preclude leakage of said pressure liquid past said stem other than in the direction of said gate.

5. The machine as claimed in claim 3, said gate stem bearing means comprising a sleeve including a radially inner seal to preclude leakage of liquid between said stem and said bearing sleeve and a radially outer seal to preclude leakage of said pressure liquid between said sleeve and said recess.

6. The machine as claimed in claim 3, said bearing means having a radially inner seal to limit the passage of liquid between said stem and the bearing means, a radially outer seal between said bearing means and said recess to limit leakage therepast, said stem seal means including a radially outer seal in sealing relation with the recess, to ensure passage of said pressure liquid between said stem and said stem seal means in flushing relation therewith.

7. The machine as claimed in claim 3 having said loading spring means interposed between said stem seal means and said bearing means to secure said stem seal means in resilient loaded relation against said gate end surface.

8. The machine as claimed in claim 7, said liquid introducing passage means including an annular passage extending about an outer peripheral surface portion of said bearing means to provide said flushing liquid in surrounding relation to the bearing means, said loading spring means located in axially interposed relation between the bearing means and said stem seal means providing a radially inwardly extending flow passage for said flushing liquid for passage thereof between said stem and said stem seal means, for subsequent passage therefrom in radially outward flushing relation across said gate end surface.

* * * * *